May 30, 1961  R. C. DEVY ET AL  2,986,628
TRACK CIRCUITS
Filed May 27, 1957
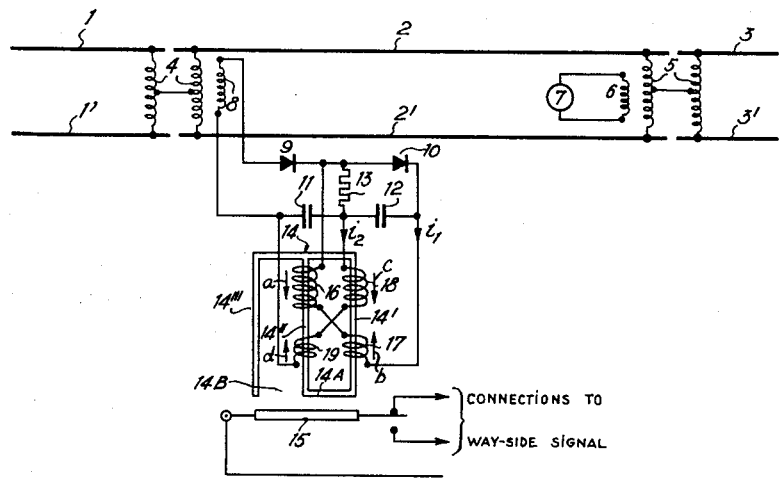

United States Patent Office 2,986,628
Patented May 30, 1961

2,986,628
TRACK CIRCUITS

Robert C. Devy, Garges-les-Gonesse, and Jacques F. Peslier, Saint-Ouen, France, assignors to Forges et Ateliers de Constructions Electriques de Jeumont, Paris, France, a corporation of France Filed May 27, 1957, Ser. No. 661,950

Claims priority, application France June 1, 1956,

4 Claims. (Cl. 246—34)

This invention relates generally to track circuits for block-system railway signalling, and more particularly to an improved electrical energy storage apparatus for rendering operative the block signal of said track circuits.

It is a principal object of the invention to provide an improved electrical energy storage device associated with an automatic-signal track circuit receptive of periodic signalling current impulses of selected time sequence or repetition rate so that a selective signal track relay, energized by the storage device, associated with the signals is free of the disturbing influence and of the effects of any alternating or pulsating current in the track circuit, having a frequency other than the selected frequency or given time sequence of the periodic signalling current impulses.

Another object of the invention is to provide a suitable track relay adapted to cooperate with the above mentioned energy-storage device.

A feature of the electrical energy-storage device in accordance with the invention is that a bridge circuit comprises two condensers and two rectifiers each arranged in a branch circuit with a resistance member connected between the condenser branch circuits and the rectifier branch circuits in such a way as to control the values of different currents delivered from the rectifiers to the condensers thereby to control selectively the rate of charging of the condensers by successive impulses of signalling current in the track circuit.

The direct current track relay associated with the energy-storage device for operating the signals is a selective signal relay in that it will respond or be rendered operative only by signalling current impulses in the track circuit having a specific or selected frequency.

Other objects, features and advantages of the invention will be understood from the following description and claims in conjunction with the accompanying drawing which illustrates diagrammatically by way of example a preferred embodiment of the system.

The drawing shows automatic-signal track circuits comprising lengths of track 1—1', 2—2' and 3—3', connected together by the customary impedance bonds 4 and 5 provided at the insulated joints as shown for ensuring the passage of the return currents of the electric traction motors driving the vehicles.

In order to describe the invention it will be assumed that the left-hand winding of the inductive connection or impedance bond 5 is coupled to an input winding 6, energized by a suitable generator 7 which supplies unidirectional periodic signalling current impulses each having the form of a narrow peak, the duration of which is of the order of some milliseconds. The peaks are largely spaced, their specific frequency or timed sequence being equal, for example, to two impulses per second. These impulses pass along the rails 2—2' and through the right-hand winding of the impedance bond 4 to induce in an output winding 8 secondary currents which are transmitted to an energy-storage device.

This latter device consists of a bridge circuit which comprises two rectifiers 9 and 10 of the same polarity arranged in series on one side and two condensers 11 and 12 arranged in series on the other side, with a resistance 13, connected to points between the two rectifiers and between the two condensers respectively as shown. The resistance 13 has a value in the order of fifty ohms which depends upon the length of the track circuit. As the currents supplied by the winding 8 are rectified, the two condensers are charged at different rates and thus to different levels. The condenser 11 is charged in series with the resistance 13, whereas the condenser 12 is charged as a function of the voltage appearing at the terminals of this resistance.

During the intervals between the successive impulses, the two condensers discharge into discharging circuits comprising the windings of a particular track relay which comprises a magnetic circuit 14 having three limbs, 14', 14" and 14'", two of which are connected by a magnetic end bridge 14A and an armature 15. The limbs 14' and 14" carry several windings, for example, four windings 16, 17, 18 and 19. The track relay is constructed to maintain a wayside signal (not shown) in a certain position when the armature is attracted and to cause the signal to reach another position when the armature drops out.

According to a particular feature of this track relay the coil 16 of the limb 14" has a greater number of turns than the coil 17 which is connected in series with coil 16 and carried by the limb 14'. Similarly, the coil 18 of the limb 14' has a greater number of turns than the coil 19 of the limb 14". Both pairs of coils are cross-connected as shown.

The respective directions of corresponding coil fluxes are indicated for instance by arrows $a$, $b$, $c$, $d$, the coil 19 being wound in opposition to the coil 16, and the coil 17 in opposition to the coil 18, whereby the resulting flux in limb 14" corresponds to the difference between the ampere-turns of 16 and 19 and the resulting flux in limb 14' corresponds to the difference between the ampere-turns of coils 18 and 17. The rectifiers 9 and 10 are formed by two identical selenium or silicium units connected in series; and each of them being capable of carrying in the forward direction current of 500 milliamps, and of withstanding in the opposite direction a reverse voltage of 200 v. The coil 19 has about 20,000 turns producing a magnetic flux which is directed upwardly. The coil 16 produces an opposite flux and is wound with more than 100,000 turns. The coil 17 acting in the same direction as coil 19, has about 300 turns, and the coil 18 has about 40,000 turns producing a flux which is directed downwardly. The resulting downwardly directed flux in limb 14" is due to the difference between the ampere-turns of coils 16 and 19, and the downwardly directed resulting flux in limb 14' is due to the difference between the ampere-turn of coils 18 and 17.

As stated above, there are normally about two impulses per second with relatively long time intervals between them. In such a case of normal frequency, both above resulting fluxes of the relay which have the same downward direction are equal so that there is no flux in the magnetic bridge 14A, whereby the armature 15 is strongly attracted.

As a result, two magnetic conditions have to be satisfied for holding the armature 15 in its attracted upper position: first, the above two differences between the ampere-turns of the coils 16 and 19 on the one hand and of the coils 18 and 17 on the other hand must be equal, and therefore, both resulting magnetic fluxes produced in the limbs 14' and 14" must be equal too, secondly, the fluxes in the limbs 14' and 14" must have the same direction. In such a case the above two fluxes flow through the armature 15, and a sufficient resulting return flux appears in the limb 14''' and in the air-gap 14B.

But if any one of the above two conditions is not satisfied, the armature 15 drops out immediately.

The successive impulses charge the condenser 11 step by step. The condenser 11 has a value of about 40 microfarads and the condenser 12 which has a value of about 20 microfarads. The impulses flow mainly through the rectifier 9 and the resistance 13 to charge directly the condenser 11. Thereby they produce in the resistance 13 a voltage drop by which the smaller condenser 12 is indirectly charged through the rectifier 10. A low percentage of the impulses passes in series through the elements 9, 10, 12 and 11, but due to the high impedance of this latter circuit, the above percentage is practically negligible.

On the other hand, the normal impulses, which are of very short duration, behave as high frequency phenomena and are, therefore, unable to build up noticeable currents in the coil circuits 18—19 and 17—16. These circuits have, at high frequencies, considerable impedances due to the great number of coil turns. As a result, the charging currents of both condensers 12 and 14 practically do not flow through the track relay coils.

The discharging currents have much longer durations, which correspond to the relatively long time intervals of the order of half a second which separate the normal frequency impulses.

Therefore, the discharging currents effectively flow through the above coil circuits, and they can reach operative values which, while being limited by the above impedances, are sufficient for discharging step by step the condensers 11 and 12. The discharging currents $i_1$ of condenser 12 flow through the elements 17, 16 and 13; the discharging currents $i_2$ of condenser 11 flow through the elements 18 and 19, but not through the resistance 13. As a result, this element 13 carries the charging currents of condenser 11 and the discharging currents of condenser 12. It will be shown below that the values of both discharging currents $i_1$ and $i_2$ depend upon the frequency of the impulses, but they depend in different ways on this frequency because of the fact that the charging and discharging rates of both condensers are modified in different ways by variations of time intervals between successive impulses. Therefore, the aforesaid magnetic conditions can only be obtained for a definite frequency of impulses.

This frequency-responsive operation of the special track relay can be briefly explained in the following manner. If the frequency of the impulses is below the normal value, the condenser 11 has sufficient time to discharge during these long time intervals; its charging current impulses are therefore relatively important and as stated above, they produce a high voltage across the resistance 13, which charges the condenser 12 in a normal manner. But, if the frequency of the impulses is abnormally high, the condenser 11 remains fully charged because its discharging currents $i_2$ cannot build up sufficiently during the abnormally short time intervals between the impulses. Therefore, no substantial charging impulses flow through the resistance 13, so that the condenser 12 remains practically uncharged. As a result, the normal voltage distribution across both condensers is completely unbalanced, and the currents $i_1$ and $i_2$ which flow through the relay are seriously modified, whereby the above specified magnetic equilibrium conditions are no longer obtained, and the relay drops out.

The above explanations show more generally that for a given frequency of the signalling impulses, the two magnetic conditions set out above can be satisfied by appropriate values of the two condensers 11 and 12, of the resistance 13, and by appropriate selection of the numbers of turns and directions of winding of the coils 16 to 19, without using resonance phenomena and tuned circuits which cannot be conveniently used in connection with time spaced current impulses. It has been found that these conditions remain satisfied, that is to say, that the armature 15 of the track relay will remain attracted, even if the voltage of the impulses furnished by the generator 7 varies within wide limits.

However, the abovesaid appropriate selection of these various elements is valid only for one definite frequency. In the presence of impulses of another frequency, or of an alternating current of industrial frequency, the equilibrium of the ampere turns created on the magnetic circuit by the windings of the relay is completely destroyed, and the armature 15 drops out immediately. The same is true if any one of the elements 8 to 13 or 16 to 19 is accidentally short-circuited or interrupted, so that the security of operation is complete.

It will be understood that any disturbing currents can only make the track relay armature drop out on condition that they exceed a certain minimum or threshold value, which can be adjusted.

While a preferred embodiment of the invention has been illustrated and described, it will be understood that the invention is in no way limited to this embodiment and that many changes may be made within the spirit and scope of the invention as defined by the following claims.

What we claim and desire to secure by Letters Patent is:

1. In an automatic electric signalling system having visual signal means, a track circuit receptive of periodic unidirectional electrical signalling current impulses in a given time sequence, an electrical energy storage device comprising a first electrical energy storage circuit including a condenser, a second electrical energy storage circuit including another condenser, a first and second rectifying circuit for charging with rectified current said first and second storage circuits respectively during successive impulses in said track circuit, inductive means connected for inductively coupling said first and second charging circuits to the output end of said track circuit, each of said first and second charging circuits comprising rectifier means, a selective signal current-responsive device arranged for operating said signal means as a function of said signalling current impulses, comprising a first discharging circuit connected to discharge said first storage circuit between successive impulses in said track circuit, a second discharging circuit connected for discharging said second storage circuit between successive impulses in said track circuit, each of said discharging circuits comprising a pair of inductive windings connected in series, each pair of windings having turns wound in opposition to each other, a magnetic circuit having three limbs, a magnetic bridge between the ends of two limbs, said pairs of inductive windings being carried by said bridged limbs and interconnected crosswise, an armature cooperating with said magnetic circuit, resistance means connected between said charging and discharging circuits at points such that each of said storage circuits are charged with rectified currents of different value, one of which is a function of a voltage across said resistance means, whereby said storage circuits are charged at different rates and to different levels when said signal impulses are present, and the attraction of said armature is a definite function of the frequency of said impulses, the values of said condensers and of said resistance means and the numbers of turns of said inductive windings being selected so that the armature is only held in attracted position for a selected frequency.

2. In an automatic electrical signalling system having visual signal means, a track circuit receptive of periodic unidirectional electrical signalling current impulses in a given time sequence, an electrical energy storage device comprising a first electrical energy storage circuit including a condenser, a second electrical energy storage circuit including another condenser, a first and second rectifying circuit for charging with rectified current said first and second storage circuits respectively during successive impulses in said track circuit, inductive means connected for inductively coupling said first and second charging circuits to said track circuit, each of said first and second charging circuits comprising rectifier means, a selective signal current-responsive track-relay arranged for operating said signal means as a function of said signalling current impulses comprising a first discharging circuit connected to discharge said first condenser between successive impulses in said signal circuit, a second discharging circuit connected for discharging said second condenser between successive impulses in said signal circuit, each of said discharging circuits comprising a pair of inductive windings, the windings of each of the pairs of windings being in opposition to each other, a magnetic circuit having a first limb without windings, two other limbs having a magnetic bridge between their ends and carrying said inductive windings which are cross connected, an armature cooperating with said limbs, resistance means connected between said charging and discharging circuits at points such that each of said storage circuits are charged with currents of different value, one of which is a function of a voltage across said resistance and another of which is a current passing through said resistance means, whereby said storage circuits are charged at different rates and to different levels when said signal impulses are present in said signalling circuit, the number of turns in said inductive windings, the condensers, and the resistance means being selected so that when said storage circuits discharge simultaneously between successive impulses in said signalling circuit, the flux between said limbs and said armature suitably depends upon the frequency of said impulses, whereby the armature of said current-responsive track relay device is only maintained in an attracted position when said given sequence of signalling current obtains and drops out in the presence of any abnormal frequencies.

3. In an automatic electric signalling system having visual signal means, a track circuit receptive of periodic unidirectional electrical signalling current impulses, an electrical energy storage device comprising a first electrical energy storage circuit including a first capacitance means, a second electrical energy storage circuit including a second capacitance means for charging with rectified current said first and second storage circuits respectively during successive impulses in said track circuit, inductive means connected for inductively coupling said first and second charging circuits to the output end of said track circuit, a selective signal current-responsive device arranged for selectively operating said signal means, and comprising a first discharging circuit connected to discharge said first storage circuit between successive impulses in said track circuit, a second discharging circuit connected for discharging said second storage circuit between successive impulses in said track, each of said discharging circuits comprising a pair of inductive windings, said windings in each pair being wound in opposition, the current-responsive means having the characteristic of being operated to a closed position only when selected, different current values exist in each of said discharging circuits and means connected to said rectifying and charging circuits for controlling separately the values of the current in each discharging circuit as a function of only one selected frequency of signalling impulses, whereby said current-responsive means is operated to a closed position in response only to said selected frequency of impulses.

4. In an automatic electrical signalling system having visual signal means, a track circuit receptive of periodic unidirectional electrical signalling current impulses in a given time sequence, an electrical energy storage device comprising a first electrical energy storage circuit including a condenser, a second electrical energy storage circuit including another condenser, a first and second rectifying circuit for charging with rectified current said first and second storage circuits respectively during successive impulses in said track circuit, inductive means connected for inductively coupling said first and second charging circuits to said track circuit, each of said first and second charging circuits comprising rectifier means, a selective signal current-responsive track-relay arranged for operating said signal means as a function of said signalling current impulses comprising a first discharging circuit connected to discharge said first condenser between successive impulses in said signal circuit, a second discharging circuit connected for discharging said second condenser between successive impulses in said signal circuit, each of said discharging circuits comprising a pair of inductive windings, each pair comprising windings the turns of which are wound in opposition, and one of which has more turns than the other, a magnetic circuit having a first limb without windings, two other limbs having a magnetic bridge between their ends and carrying said inductive windings which are cross connected, one winding of each pair of windings being disposed on each of said two other limbs of said magnetic circuit, means connecting the windings in each pair in series, an armature cooperating with said limbs, resistance means connected between said charging and discharging circuits at points such that each of said storage circuits are charged with currents of different value, one of which is a function of a voltage across said resistance and another of which is a current passing through said resistance means, whereby said storage circuits are charged at different rates and to different levels when said signal impulses are present in said signalling circuit, the numbers of turns in said inductive windings, the condensers, and the resistance means being selected so that when said storage circuits discharge simultaneously between successive impulses in said signalling circuit, the flux between said limbs and said armature suitably depends upon the frequency of said impulses, whereby the armature of said current-responsive track relay device is only maintained in an attracted position when said given sequence of signalling current obtains and drops out in the presence of any abnormal frequencies.

References Cited in the file of this patent

UNITED STATES PATENTS

| | | |
|---|---|---|
| 1,482,122 | Fanning | Jan. 29, 1924 |
| 1,736,816 | Almquist | Nov. 26, 1929 |
| 1,758,540 | Shaw | May 13, 1930 |
| 1,810,024 | Mathes | June 16, 1931 |
| 2,144,847 | Miller | Jan. 24, 1939 |
| 2,147,688 | Burton | Feb. 21, 1939 |